United States Patent
Peng et al.

(10) Patent No.: US 8,412,793 B2
(45) Date of Patent: Apr. 2, 2013

(54) METHOD, DEVICE AND SYSTEM FOR DELIVERY RESUME OF DYNAMIC CONTENT

(75) Inventors: Jin Peng, Shenzhen (CN); Hongtao Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 814 days.

(21) Appl. No.: 12/211,736

(22) Filed: Sep. 16, 2008

(65) Prior Publication Data

US 2009/0013039 A1  Jan. 8, 2009

Related U.S. Application Data

(63) Continuation of application No. PCT/CN2007/000133, filed on Jan. 12, 2007.

(30) Foreign Application Priority Data

Mar. 17, 2006  (CN) .......................... 2006 1 0065134

(51) Int. Cl.
*G06F 15/16* (2006.01)
*G06F 15/173* (2006.01)

(52) U.S. Cl. ........ 709/217; 709/203; 709/227; 709/231; 709/248

(58) Field of Classification Search .................. 709/203, 709/217–219, 223, 224, 227, 228, 231, 248; 715/742, 744, 748; 714/15, 18, 20, 48, 748
See application file for complete search history.

(56) References Cited

U.S. PATENT DOCUMENTS

| | | | |
|---|---|---|---|
| 6,505,253 B1 * | 1/2003 | Chiu et al. | 709/235 |
| 6,606,646 B2 | 8/2003 | Feigenbaum | |
| 6,694,471 B1 * | 2/2004 | Sharp | 714/749 |
| 6,704,785 B1 * | 3/2004 | Koo et al. | 709/227 |
| 6,754,699 B2 * | 6/2004 | Swildens et al. | 709/217 |
| 6,862,628 B2 | 3/2005 | Moore et al. | |
| 6,901,447 B2 * | 5/2005 | Koo et al. | 709/227 |
| 6,976,090 B2 * | 12/2005 | Ben-Shaul et al. | 709/246 |

(Continued)

FOREIGN PATENT DOCUMENTS

| | | |
|---|---|---|
| CN | 1627290 A | 6/2005 |
| CN | 1688147 A | 10/2005 |

(Continued)

OTHER PUBLICATIONS

State Intellectual Property Office of the People's Republic of China, Examination Report in Chinese Patent Application No. 2006100651347 (Dec. 14, 2007).

(Continued)

*Primary Examiner* — Lynn Feild
*Assistant Examiner* — Melvin H Pollack
(74) *Attorney, Agent, or Firm* — Leydig, Voit & Mayer,

(57) ABSTRACT

The present invention discloses a method for delivery resume of dynamic content comprising: after detecting a delivery channel to a client that receives dynamic content is recovered to normal, or receiving a request for delivering resume of dynamic content from the client, the dynamic content delivery server determines a delivery resume mode, and delivers the dynamic content to the client in the determined delivery resume mode. The present invention further provides a corresponding client, a corresponding server, and a corresponding dynamic content delivery system. The present invention can determine the delivery resume mode in accordance with dynamic information of the client and type of the dynamic content to be delivered, thereby it is ensured that the delivered dynamic content is the information that the client needs, and waste of network transmission resources is avoided.

9 Claims, 6 Drawing Sheets

U.S. PATENT DOCUMENTS

| | | | |
|---|---|---|---|
| 7,013,419 B2 * | 3/2006 | Kagan et al. | 714/749 |
| 7,058,083 B2 * | 6/2006 | Melpignano et al. | 370/467 |
| 7,146,426 B2 * | 12/2006 | Hashimoto | 709/237 |
| 7,149,782 B2 * | 12/2006 | Sommerer | 709/206 |
| 7,149,783 B2 * | 12/2006 | Frolik et al. | 709/207 |
| 7,187,658 B2 * | 3/2007 | Koyanagi et al. | 370/254 |
| 7,209,953 B2 * | 4/2007 | Brooks | 709/206 |
| 7,237,033 B2 * | 6/2007 | Weigand et al. | 709/231 |
| 7,251,690 B2 * | 7/2007 | Williams | 709/224 |
| 7,299,293 B2 * | 11/2007 | Yoshimura et al. | 709/232 |
| 7,370,064 B2 * | 5/2008 | Yousefi'zadeh | 1/1 |
| 7,392,319 B2 * | 6/2008 | Liu et al. | 709/231 |
| 7,395,355 B2 * | 7/2008 | Afergan et al. | 709/247 |
| 7,403,914 B2 * | 7/2008 | Janakiraman et al. | 705/26 |
| 7,484,001 B2 * | 1/2009 | Lerner | 709/240 |
| 7,484,087 B2 * | 1/2009 | Doddington | 713/150 |
| 7,500,018 B2 * | 3/2009 | Hakansson et al. | 709/246 |
| 7,502,836 B1 * | 3/2009 | Menditto et al. | 709/217 |
| 7,519,030 B2 * | 4/2009 | Cimini et al. | 370/338 |
| 7,542,471 B2 * | 6/2009 | Samuels et al. | 370/392 |
| 7,698,453 B2 * | 4/2010 | Samuels et al. | 709/234 |
| 7,701,904 B2 * | 4/2010 | Lee et al. | 370/331 |
| 7,701,969 B2 * | 4/2010 | Carrigan et al. | 370/466 |
| 7,747,894 B2 * | 6/2010 | Musayev et al. | 714/4 |
| 7,751,409 B1 * | 7/2010 | Carolan | 370/395.53 |
| 7,752,258 B2 * | 7/2010 | Lewin et al. | 709/203 |
| 7,814,208 B2 * | 10/2010 | Stephenson et al. | 709/227 |
| 2002/0091853 A1 | 7/2002 | Moore et al. | |
| 2002/0173905 A1 | 11/2002 | Jin et al. | |
| 2002/0194388 A1 | 12/2002 | Boloker et al. | |
| 2003/0152058 A1 | 8/2003 | Cimini et al. | |
| 2003/0236895 A1 | 12/2003 | Ohkubo et al. | |
| 2004/0063459 A1 | 4/2004 | Yamashita et al. | |
| 2004/0158632 A1 * | 8/2004 | Sasaki | 709/224 |
| 2006/0080456 A1 * | 4/2006 | Hur et al. | 709/231 |
| 2007/0100978 A1 * | 5/2007 | Levi et al. | 709/223 |
| 2007/0143490 A1 * | 6/2007 | Gallou et al. | 709/231 |
| 2009/0157544 A1 * | 6/2009 | Piccionelli et al. | 705/39 |

FOREIGN PATENT DOCUMENTS

| | | |
|---|---|---|
| CN | 100591016 C | 2/2010 |
| JP | 6-243059 A | 9/1994 |
| JP | 11-313048 A | 11/1999 |
| JP | 2002152311 A | 5/2002 |
| JP | 2002-217810 A | 8/2002 |
| JP | 2004-222046 A | 8/2004 |
| JP | 2004-364006 A | 12/2004 |
| JP | 2005-79909 A | 3/2005 |
| JP | 2006-243059 A | 9/2006 |
| WO | WO 2005/004505 A2 | 1/2005 |

OTHER PUBLICATIONS

State Intellectual Property Office of the People's Republic of China, Examination Report in Chinese Patent Application No. 2006100651347 (Apr. 18, 2008).

State Intellectual Property Office of the People's Republic of China, Examination Report in Chinese Patent Application No. 2006100651347 (Aug. 1, 2008).

State Intellectual Property Office of the People's Republic of China, Examination Report in Chinese Patent Application No. 2006100651347 (Nov. 7, 2008).

Korean Patent Office, Examination Report in Korean Patent Application No. 10-2008-7024731 (Apr. 27, 2010).

European Patent Office, Extended European Search Report in European Patent Application No. 07702065.9 (Mar. 16, 2009).

State Intellectual Property Office of the People's Republic of China, English Translation of Written Opinion of the International Searching Authority in International Patent Application No. PCT/CN2007/000133 (Apr. 26, 2007).

European Patent Office, First Office Action in European Application No. 07 702 065.9-2413 (Jan. 27, 2012).

1st Office Action in corresponding Japanese Application No. 2009-500688 (Dec. 14, 2010).

Reasons for Refusal in corresponding Japanese Application No. 2009-500688 (Jun. 7, 2011).

* cited by examiner

METHOD, DEVICE AND SYSTEM FOR DELIVERY RESUME OF DYNAMIC CONTENT

CROSS-REFERENCE TO RELATED APPLICATION

This application is a continuation of International Patent Application No. PCT/CN2007/000133, filed Jan. 12, 2007, which claims priority to Chinese Patent Application No. 200610065134.7, filed Mar. 17, 2006, each of which is hereby incorporated by reference in its entirety.

FIELD OF THE INVENTION

The present invention relates to the field of communication, particularly, to a method for delivery resume of dynamic content based on the Client/Server (C/S) architecture and corresponding client, a dynamic content delivery server, and a dynamic content delivery system.

BACKGROUND OF THE INVENTION

The dynamic content delivery is a technique that is adapted to send customized contents to mobile client users on the basis of the C/S architecture. The user subscribes for the contents, and the server customizes the contents in accordance with the user's parameters, location, and presence information, etc, and delivers the contents to the client user at scheduled time.

During the process of sending the dynamic contents, sometimes the client or server may become inaccessible due to network congestion, power exhaustion of the client, or other reasons; therefore, the connection between the client and the server is broken, and the delivery of dynamic contents is interrupted. In such cases, the party which is normal will fall into a state of suspension. After the connection is recovered with the resume technique in Hyper Text Transport Protocol (HTTP) or File Transfer Protocol (FTP) or other protocols, the dynamic contents can be delivered from the previous breaking point, instead of being delivered from the beginning again.

The resume method in HTTP is as follows:
When the client requests to download a file from the server, the HTTP message header is as follows:
GET http://host.foo.bar/pic-dir/picture.gif
Host: host.foo.bar
Accept: image/gif, image/jpg
The HTTP response message from the server is as follows:
HTTP/1.1 200 OK
Server: CoolServer/1.3.12
Content-Length: 25432
Content-Type: image/gif
Accept-Ranges: bytes
ETag: fasd987sadf98@example.com/1.1
... GIF picture ....
The field Content-Length and the field Accept-Ranges indicate the file size is 25432 bytes. For some reason, the connection is broken after 1034 bytes have been sent. When the client requests the server to continue the delivery, the HTTP request message is as follows:
GET http://host.foo.bar/pic-dir/picture.gif
Host: host.foo.bar
Accept: image/gif, image/jpg
Range: 1034-25431
If-Match: fasd987sadf98@example.com/1.1

The field Range indicates the requested range of the resume delivery, i.e. starting the delivery from the 1034th byte of the file. The response message from the server is as follows:
HTTP/1.1 206 Partial Content
Server: CoolServer/1.3.12
Content-range: bytes 1034-25431/25432
Content-Type: image/gif
Accept-Ranges: bytes
ETag: fasd987sadf98@example.com/1.1
The response message uses a state code 206, which indicates the start of partial delivery now; the field Content-Length indicates the part to be delivered, and is denoted in byte; and after the server responds to the client with the above message, the subsequent content delivery process will be identical with the delivery process in normal condition.

However, the method of resume delivery from breakpoint in the conventional art has the following drawbacks:

Before the connection is recovered to normal, the dynamic information of the user client may have changed, such as client capability, the presence state of the client, etc. For example, when the user drives a car and requests traffic condition information, the server that transmits the dynamic contents will send the traffic condition information of a certain road section to the client, in accordance with the current location of the user; in the case that the connection is interrupted during the delivery process due to some causes, such as network failure, if the server instantly employs the resume method in the conventional art to transmit the traffic condition information that is not delivered completely to the client after the connection is recovered to normal, the user may be misled by the information. This is because the user is in a moving state and his geographical location has been changed. Therefore, the traffic condition information of the original road section is not needed now. Therefore, in the conventional art, when the delivery of dynamic contents is resumed, since the dynamic content that is not delivered completely is delivered instantly from the previous breakpoint to the client without analysis of the dynamic information of the client, if the delivered dynamic content no longer meets the user's demand, it will not only waste the network bandwidth but also degrade the user experience.

SUMMARY OF THE INVENTION

The present invention provides a method for delivery resume of dynamic content to overcome the problem of the conventional art that the delivery resume method is not chosen in accordance with the dynamic information of the client when the delivery is resumed and therefore the delivered dynamic content becomes redundant information and leads to waste of network bandwidth.

The present invention further provides a client, a dynamic content delivery server, and a dynamic content delivery system.

A method for delivery resume of dynamic content includes executing the following steps: by the dynamic content delivery server, after the dynamic content delivery server detects the delivery channel to the client receiving the dynamic content is recovered to normal, or the dynamic content delivery server receives a request for delivering resume of dynamic content from the client:
determining the delivery resume mode, by the dynamic content delivery server; and
delivering the dynamic content to the client in the determined delivery resume mode.

A client includes:

a first delivery resume processing module, adapted to send a request for delivering resume of dynamic content to the dynamic content delivery server; and a dynamic content receiving module, adapted to receive the dynamic content delivered from the dynamic content delivery server in the determined delivery resume mode after the dynamic content delivery server receives the delivery resume request; or receive the dynamic content delivered from the dynamic content delivery server in the determined delivery resume mode after the dynamic content delivery server detects the delivery channel to the client is recovered to normal.

A dynamic content delivery server includes:

a delivery resume initiating module, adapted to receive the request for delivering resume of dynamic content sent by the client and/or detect the delivery channel to the client is recovered to normal;

a delivery resume mode determining module, adapted to determine the delivery resume mode that is to be used to deliver the dynamic content to the client, according to the delivery resume request from the client and/or when the delivery channel to the client is detected as recovered to normal; and a dynamic content delivery module, adapted to deliver the dynamic content to the client in the determined delivery resume mode.

A dynamic content delivery system includes a client and a dynamic content delivery server; wherein, after detecting that the delivery channel to a client which receives the dynamic content is recovered to normal or receiving a request for delivering resume of dynamic content sent by a client, the dynamic content delivery server determines the delivery resume mode, and delivers the dynamic content to the client in the determined delivery resume mode.

With above method and system, when resuming the delivery of the dynamic content, an appropriate delivery resume mode can be chosen in accordance with the dynamic information of the client and the type of the content to be delivered; in that way, it is ensured that the dynamic content delivered is the content that is needed by the client, and thereby avoiding waste of network transmission resources.

DETAILED DESCRIPTION OF THE EMBODIMENTS

Hereunder the method provided in the present invention will be further detailed in the embodiments, with reference to the accompanying drawings.

Embodiment 1

The dynamic content delivery server (hereinafter referred to as "server" for short) initiates the delivery resume process actively.

Figure 1:
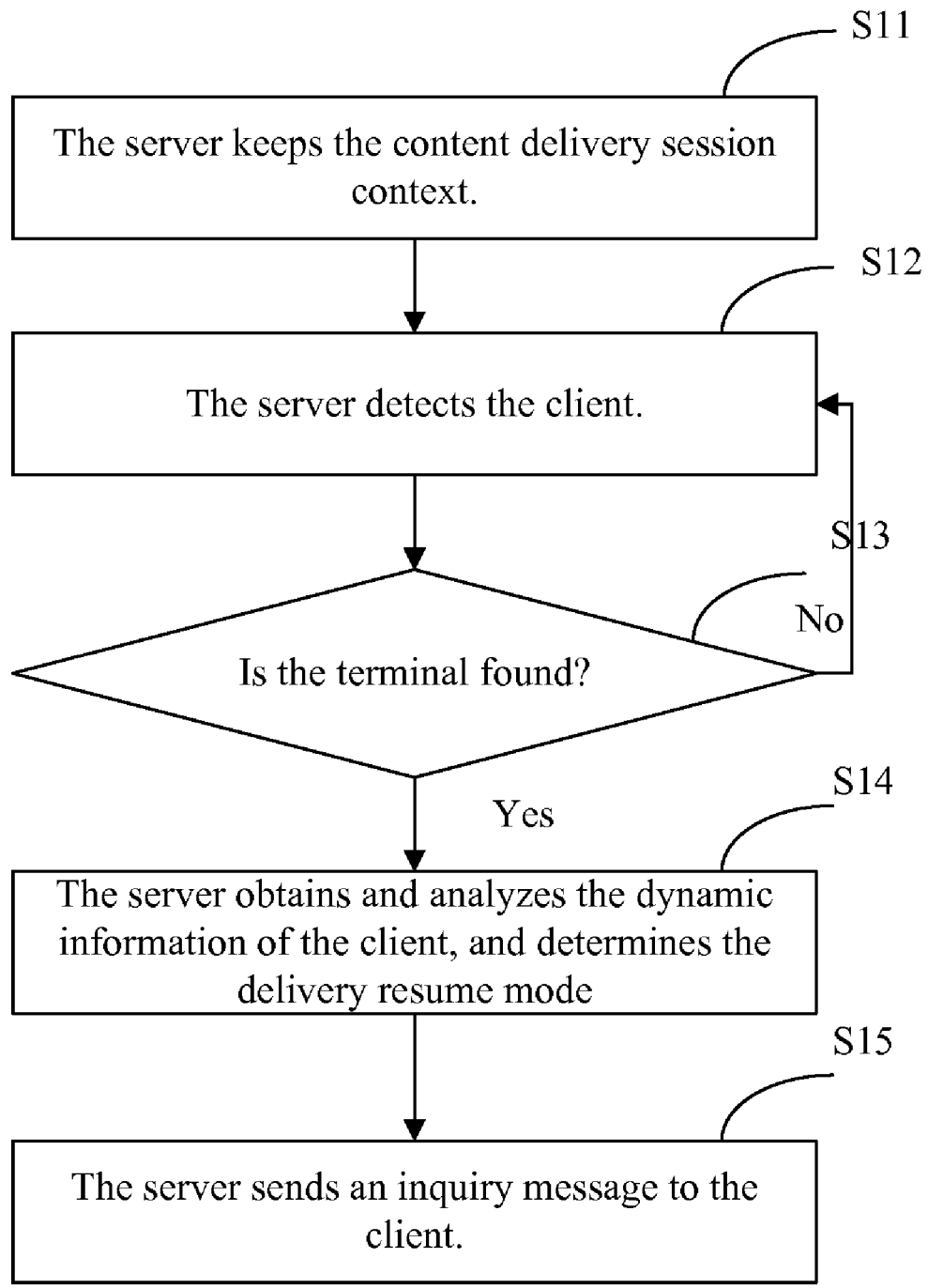
FIG. 1 is a flow diagram of sending an inquiry message by the server to the client in embodiment 1 of the present invention.

FIG. 1 is a flow diagram of sending an inquiry message by the server to the client when the server initiates the delivery resume process actively; the steps are as follows:

Step S11: When the content delivery is interrupted and the server detects that the content has not been delivered completely yet, the server will keep the content delivery session context. The server records the session identifier (ID), the content ID, the delivered range, and the client ID.

Step S12: The server detects the client.

Step S13: The server determines whether the client is found; if the client is found, then proceed with step S14; otherwise turn to step S12 and detect the client periodically.

Step S14: The server obtains the dynamic information of the client via a customized engine unit, and analyzes the obtained dynamic information to determine the delivery resume mode.

In this step, due to the fact that the dynamic information is diversified (e.g., location information, presence information, and dynamic capability information of the client, etc.), and for different types of dynamic content to be delivered, the importance of the various dynamic information of the client is different; therefore, for different types of dynamic content, different dynamic information of the client can be set with corresponding levels, and the delivery resume mode can be determined by taking account of the dynamic information with higher level.

For example, if the dynamic content is recreational video content, the corresponding levels of the dynamic information can be set from top to bottom as follows: presence information of the client, dynamic capability (memory size) of the client, and location information (Loc) of the client, this is because, for delivering recreational video content to a client, the presence information of the client user is the most important (when the user is working, such content should not be delivered; when the user is at leisure, such content may be delivered); the next is whether the memory size of the client is enough to receive the video information; as for the specific location of the client, it is of little importance for delivering recreational video content; therefore, the server shall obtain the presence information of the client first, so as to decide which delivery resume mode is to be used; the location information of the client can be left out of account. For another example, if the dynamic content to be delivered is traffic condition information, the corresponding levels of the dynamic information of the client can be set from top to bottom as follows: location information of the client, presence of the client user, and dynamic capability of the client. Therefore, when preparing to resume delivery of the traffic condition information to the client, the server shall obtain the location information of the client first, so as to decide which delivery resume mode is to be used, and dynamic capability of the client can be left out of account.

Specific delivery resume modes include, but are not limited to:

Normal (instant) Resume: the dynamic content that was not delivered completely is delivered to the client, and starting from the breakpoint;

Deferred delivery resume: the dynamic content that was not delivered completely to is delivered to the client after a period of time; and Repersonalize: carrying out personalization again for the dynamic content to be delivered in accordance with the dynamic information of the client before resuming the delivery.

In this step, the server may determine one delivery resume mode or several optional delivery resume modes in accordance with the dynamic information of the client and the type of the dynamic content to be delivered. In this embodiment, it is taken as an example that the server determines several optional delivery resume modes.

Step S15: The server sends an inquiry message to the client, with the delivery resume options corresponding to the optional delivery resume modes carried in the message; the inquiry message further contains the content ID, file size and/or session ID for delivery resume.

In case the content delivery session in a suspended state in the server is not terminated, the inquiry message may contain the session ID, which serves as the unique ID of the session; the client can utilize the session ID to inquiry about the corresponding session and recover the session in a suspended state; if the session is terminated, the client can neglect the session ID and carry out delivery resume by establishing a new session with the server.

If the content delivery session in the server is terminated due to some reasons such as overtime, when the server sends a delivery resume inquiry message to the client in the new session, the server may not include the session ID of the last session that is interrupted in the inquiry message.

The inquiry message may further contain the range of delivery resume; if the delivery resume option in the inquiry message is Repersonalize, the inquiry message does not contain the range of delivery resume.

The interaction message between the server and the client employs eXtensible Markup Language (XML) protocol; for the inquiry message, the XML label is defined as follows:

| Protocol Description Element | XML Label |
|---|---|
| DCD message | DCD |
| DCD command | Cmd |
| Parameters of command | Para |
| Delivery resume initiator | Initiator |
| Delivery resume option | Options |
| Content ID | ContentID |
| Range of delivery resume | Range |

For example, if the delivery resume option is an instant resume, the following inquiry message is created:

```
<DCD>
    <Cmd>ResumeRequest<Cmd>          <!-The command in the message is a resume
                                         request.-->
    <Para>
        <Initiator>Server</Initiator>     <!-The Resume request is initiated by the
                                             Server.-->
        <ContentID>123456</ContentID>     <!-Content ID is used to identify
                                             the content to be delivered.-->
        <Range>1034-25431</Range>         <!-The range of the delivery
                                             resume is 1034-25431 bytes.-->
        <Options>
            <Item>
                <Name>ResumeInstant</Name>   <!-The delivery resume option
                                                is instant delivery resume:
                                                ResumeInstant.-->
                Info>...</Info>              <!-Info represents descriptive
                                                information of the delivery
                                                resume option.-->
            </Item>
        </Options>
    </Para>
</DCD>
```

Figure 2:
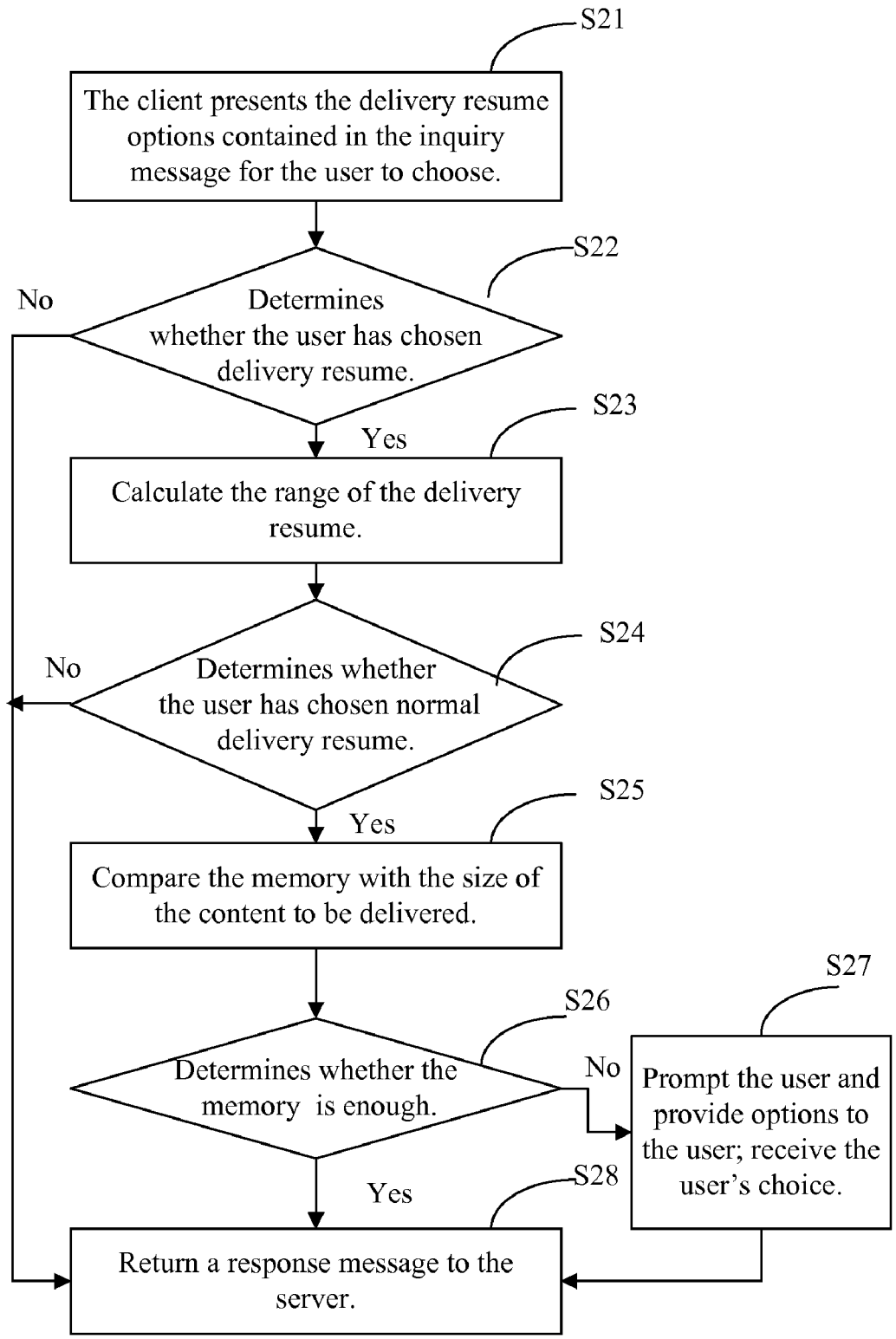
FIG. 2 is a flow diagram of returning a response message by the client to the server in embodiment 1 of the present invention.

The processing flow of returning a response message by the client to the server after the client receives the inquiry message is shown in FIG. 2, and includes the following steps:

Step S21: The client presents the delivery resume options in the inquiry message for the user to choose;

Step S22: The client determines whether the user has chosen delivery resume; if delivery resume is chosen, the client proceeds with Step S23; otherwise the client turns to Step S28;

Step S23: The client calculates the range of delivery resume. The specific method is that, the client inquiries about the size of the delivered content, and obtains the range of delivery resume in accordance with the file size carried in the inquiry message from the server; then, the client proceeds with Step S24;

Step S24: The client further determines whether the user has chosen Normal (Instant) Delivery, if the user has chosen Normal (Instant) Delivery, the client proceeds with Step S25; otherwise the client turns to Step S28;

Step S25: The client calculates the size of the content to be delivered, in accordance with the calculated range of the delivery resume; then, it compares the size of the local memory size with the calculated size of the content to be delivered, and then proceeds with step S26;

Step S26: The client determines whether the memory space is enough; if the memory space is not enough, the client proceeds with Step S27; otherwise, the client proceeds with Step S28;

Step S27: The client prompts the user that the memory space is not enough, and provides options to the user, for example, the client may request the user to delete other files to release the memory space before delivery resume, or defer delivery resume, or cancel the delivery resume, etc., and then accepts the user's choice, and proceeds with Step S28; and Step S28: The client returns a response message to the server, with the delivery resume parameters set by the user carried in the response message; furthermore, the response message may contain the range of delivery resume calculated by the client.

The range of delivery resume can be delivered by the bottom protocol of Dynamic Content Delivery (DCD) protocol; for example, it can be carried in the HTTP message header or in a DCD message. If the user's choice is Repersonalize, the response message may not contain the range of delivery resume.

A response message is exemplified as follows:

```
<DCD>
    <Cmd>ResumeResponse<Cmd>      <!-The command in the message is a
                                      delivery resume response.-->
    <Para>
        <Initiator>Server</Initiator>    <!-The Resume request is initiated by the
                                             Server.-->
        <ContentID>123456</ContentID>   <!-ContentID is used to identify
                                            the content to be delivered.-->
        <Range>1034-25431</Range>       <!-The range of the delivery
                                            resume is 1034-25431 bytes.-->
        <Options>
            <Item>
                <Name>ResumeDefer</Name>    <!-The delivery resume option is
                                                deferred delivery resume.-->
                <Info>60</Info>         <!-In the response message, Info
                                            represents the parameters of delivery
                                            resume, i.e., it is deferred 60 minutes
                                            before delivery resume.-->
            </Item>
        </Options>
    </Para>
</DCD>
```

Figure 3:
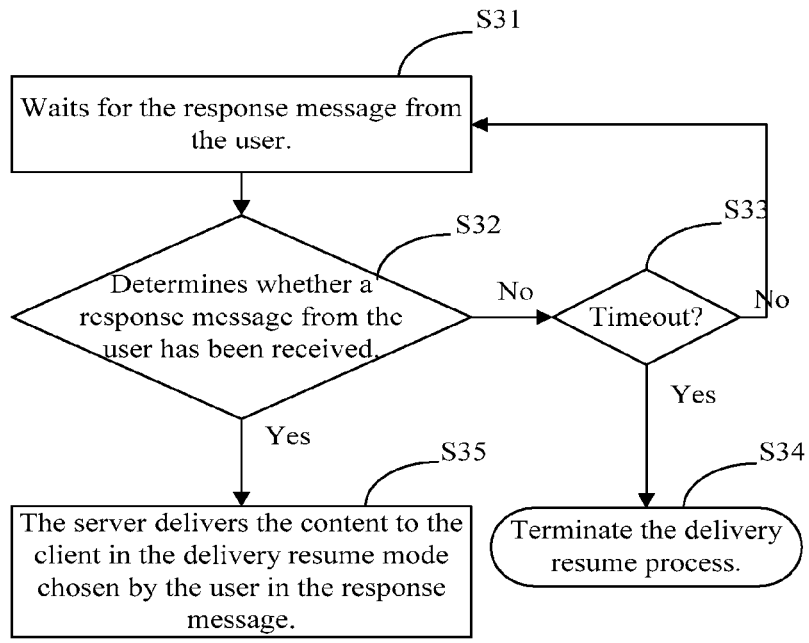
FIG. 3 is a flow diagram of receiving the response message by the server in embodiment 1 of the present invention.

After sending the inquiry message, the server waits for a response message returned by the client; the specific processing flow is shown in FIG. 3, and includes:

Step S31: The server waits for a response message returned by the client;

Step S32: The server determines whether a response message has been received; if a response message has been received from the client, the server proceeds with Step S35; if it is an overtime, then the server proceeds with Step S33;

Step S33: The server determines whether the pre-configured waiting period is expired; if the pre-configured waiting period is not expired, turn to Step S31 to continue waiting for a response message from the client; otherwise, the server proceeds with Step S34;

Step S34: The server terminates the delivery resume process; and

Step S35: The server delivers the content to the client in the delivery resume mode chosen by the user in the response message until the entire content is delivered completely.

Figure 4:
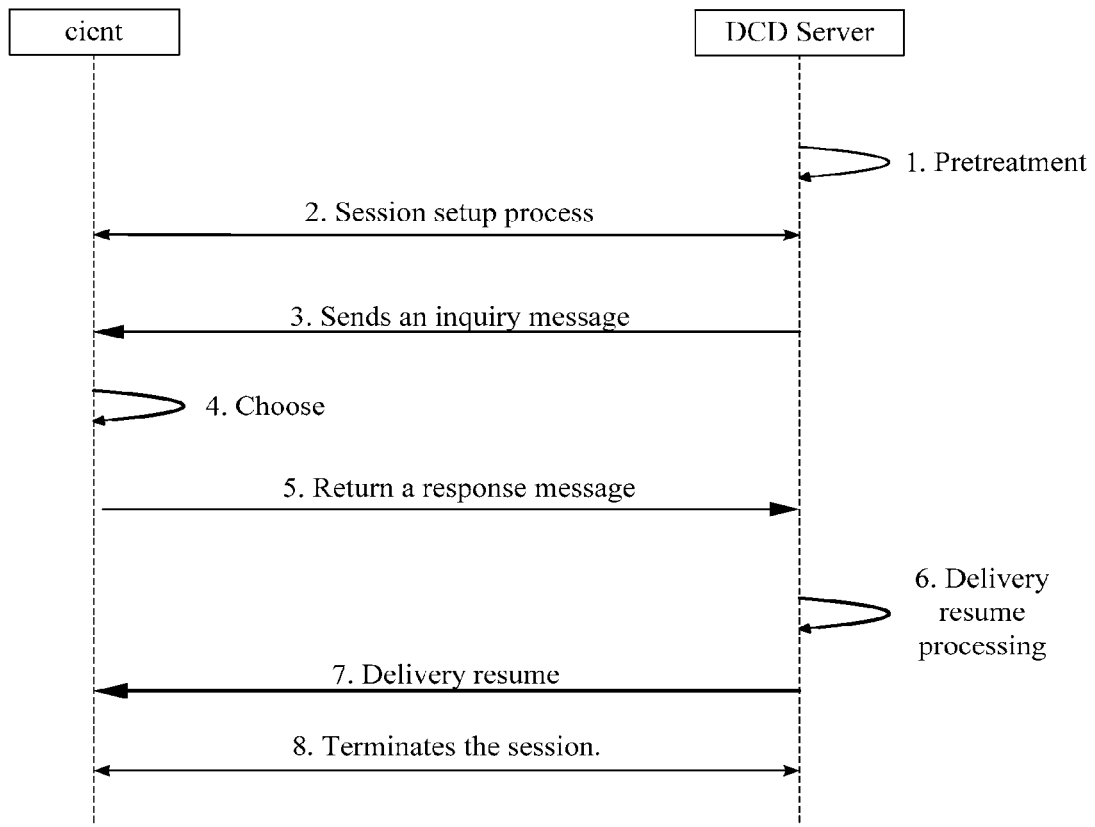
FIG. 4 is a schematic diagram of the signaling process in embodiment 1 of the present invention.

In above embodiment 1, the flow diagram of signaling interaction between the client and the server is shown in FIG. 4, and includes:

1. When the content delivery between the server and the client is interrupted, the server performs the pretreatment as follows: obtains the dynamic information of the client, and determines optional delivery resume modes in accordance with the obtained dynamic information and the type of the delivered dynamic content; detects whether the communication channel to the client is recovered to normal;

2. After the connection between the client and the server is recovered, the server establishes/recovers the content delivery session with the client;

3. The server sends an inquiry message to the client, besides the delivery resume option provided by the server, and the description/reason of the options, content ID, session ID, and file size to be delivered, etc., may also be contained in the inquiry message;

4. The client presents the delivery resume options carried in the inquiry message for the user to choose the delivery resume mode;

5. The client returns a response message to the server in accordance with the user's choice, the delivery resume parameters of the client may be carried in the response message;

6. After receiving the response message, the server obtains the delivery resume mode chosen by the user;

7. The server delivers the dynamic content to the client in the delivery resume mode chosen by the user; and 8. The content delivery session is terminated after the content delivery is completed.

Embodiment 2

A client actively initiates a delivery resume process.

After the connection between the client and the server is recovered, the client may initiate delivery resume actively by sending a resume request message to the server, with the content ID and range of the delivery resume carried in the resume request; optionally, the session ID may also be carried. The range of delivery resume can be delivered by bottom protocol of DCD protocol; for example, it can be carried in the HTTP message header or in a DCD message.

The delivery resume request message initiated by the client is exemplified as follows:

```
<DCD>
    <Cmd>ResumeRequest<Cmd>       <!-The command in the message is
                                      a delivery resume request.-->
    <Para>
        <Initiator>Client</Initiator>    <!-The delivery resume request
                                             is initiated by the Client.-->
```

-continued

```
<ContentID>123456</ContentID>     <!-ContentID is used to
                                    identify the content to be
                                    delivered.-->
<Range>1034-25431</Range>          <!-The range of the
                                    delivery resume is
                                    1034-25431 bytes.-->
</Para>
</DCD>
```

After receiving the resume request, the server proceeds with a subsequent processing flow identical with the Steps S14 and S15 shown in FIG. 1; therefore it is not described again.

The inquiry message sent from the server is exemplified as follows:

```
<DCD>
  <Cmd>ResumeReponse<Cmd>          <!-The command in the message is a
                                     delivery resume request.-->
  <Para>
    <Initiator>Client</Initiator>  <!-The delivery resume request is
                                     initiated by the Client.-->
    <ContentID>123456</ContentID>
    <Options>
      <Item>
        <Name>ResumeInstant</Name> <!-The delivery resume option
                                     is instant delivery resume.-->
        <Info>...</Info>
      </Item>
    </Options>
  </Para>
</DCD>
```

After receiving the inquiry message, the client proceeds with the steps shown in FIG. 2; after receiving the response message, the server proceeds with the steps shown in FIG. 3.

Figure 5:
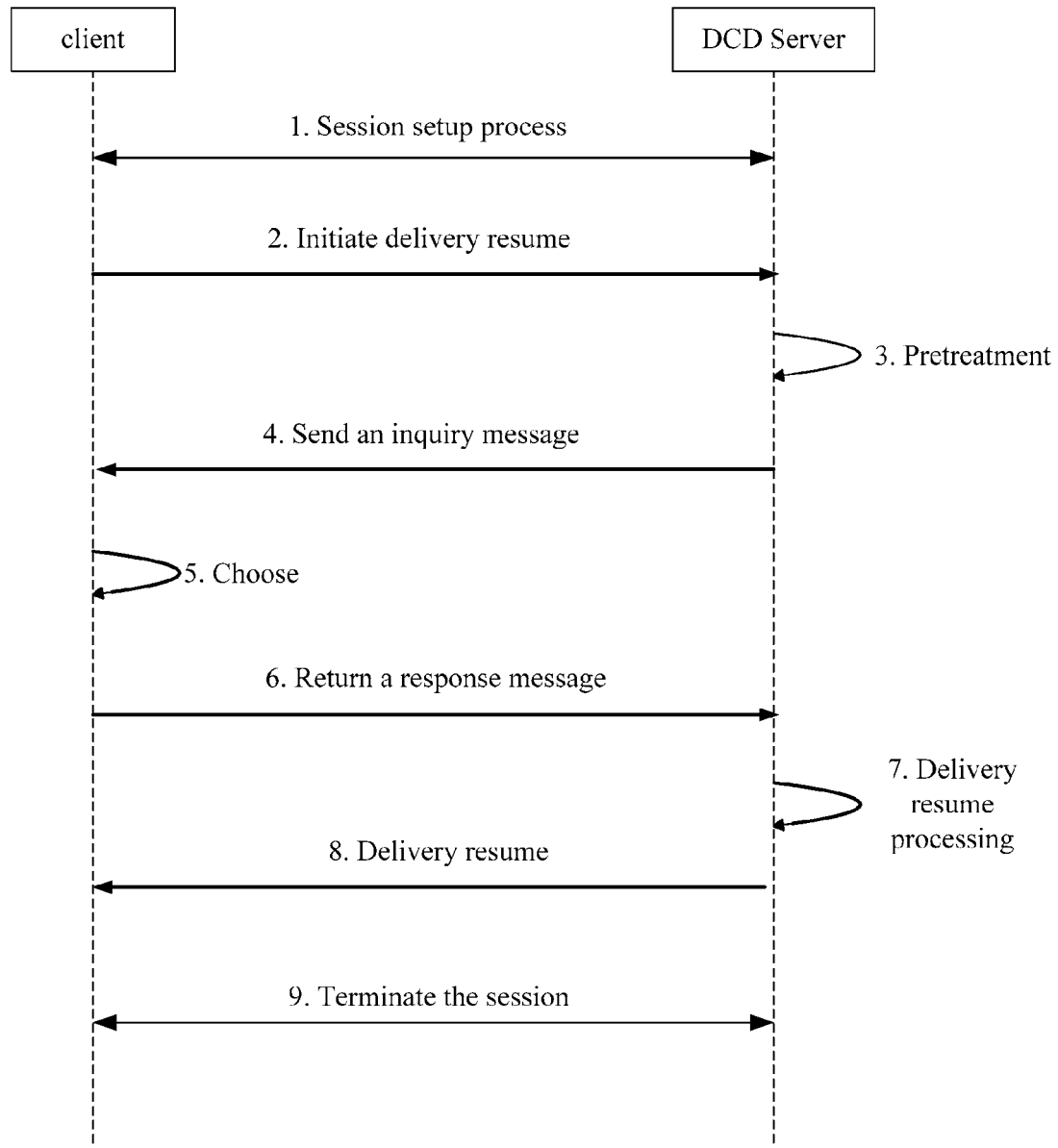
FIG. 5 is a schematic diagram of the signaling process in embodiment 2 of the present invention.

In above embodiment 2, the flow diagram of signaling interaction between the client and the server is shown in FIG. 5, and includes the following:

1. After the communication channel between the client and the server is recovered to normal, a content delivery session is established between the server and the client;

2. The client sends a delivery resume request to the server, with the content ID and range of the delivery resume carried in the request message; optionally, the session ID is also carried in the request message;

3. After receiving the delivery resume request, the server performs pretreatment as follows: the server obtains the dynamic information of the client, and determines optional delivery resume modes in accordance with the obtained dynamic information and the type of the dynamic content that is delivered;

4. The server sends an inquiry message to the client, besides the delivery resume options provided by the server, the inquiry message may further contain the description/reason of the options, content ID, session ID, and file size, etc;

5. The client presents the delivery resume options carried in the inquiry message for the user to choose the delivery resume mode;

6. The client returns a response message to the server in accordance with the user's choice;

7. After receiving the response message, the server obtains the delivery resume mode chosen by the user;

8. The server delivers the dynamic content to the client in the delivery resume mode chosen by the user; and 9. The content delivery session is terminated after the content is delivered completely.

In above Embodiment 1 and Embodiment 2, if the server determines a unique delivery resume mode in accordance with the dynamic information of the client and the type of the dynamic content to be delivered, the server may directly use the determined delivery resume mode directly to deliver the dynamic content to the client.

Alternatively, the server may send a notification message to the client to notify the client of the delivery resume mode which is employed and request the client to accept the delivery resume mode; after receiving the notification message, the client returns a response message for accepting or rejecting the delivery resume mode; upon receiving a response message for accepting the delivery resume mode returned by the client, the server delivers the dynamic content to the client in the determined unique delivery resume mode; and upon receiving a response message for rejecting the delivery resume mode returned by the client, the server directly terminates the dynamic content delivery process.

In order to fully meet the user's demand for personalization and reduce interaction message interaction between the server and the client, the delivery resume mode may be set in advance by the user and stored in the server; and when it is needed to resume the delivery of the dynamic content to the user client, the server directly delivers the dynamic content in the delivery resume mode pre-configured by the user. In that way, negotiation process of the delivery resume mode between the server and the client may be omitted, and the trouble brought by requiring the user to make confirmation/selection may also be reduced.

Alternatively, the delivery resume mode can be pre-configured by the operator and stored in the server.

When it is needed to resume delivering the dynamic content to the client, at first, the server determines whether there is a pre-configured delivery resume mode which is stored locally for the dynamic content; if there is such a delivery resume mode, the server further determines the initiator of the delivery resume mode; if the delivery resume mode is pre-configured by the client, the server will deliver the dynamic content to the client in the delivery resume mode.

If the delivery resume mode is pre-configured by the operator, the server notifies the client of the delivery resume mode; after receiving a response message for accepting the delivery resume mode from the client, the server delivers the dynamic content to the client in the delivery resume mode; if the client returns a response message for rejecting the delivery resume mode, the server proceeds with the Steps S14 and S15 shown in FIG. 1, i.e., the server determines a delivery resume mode in accordance with the dynamic information of the client and the type of the content to be delivered, and sends an inquiry message to the client for requesting the client to choose the delivery resume mode, and then delivers the content in the delivery resume mode returned from the client.

Figure 6:
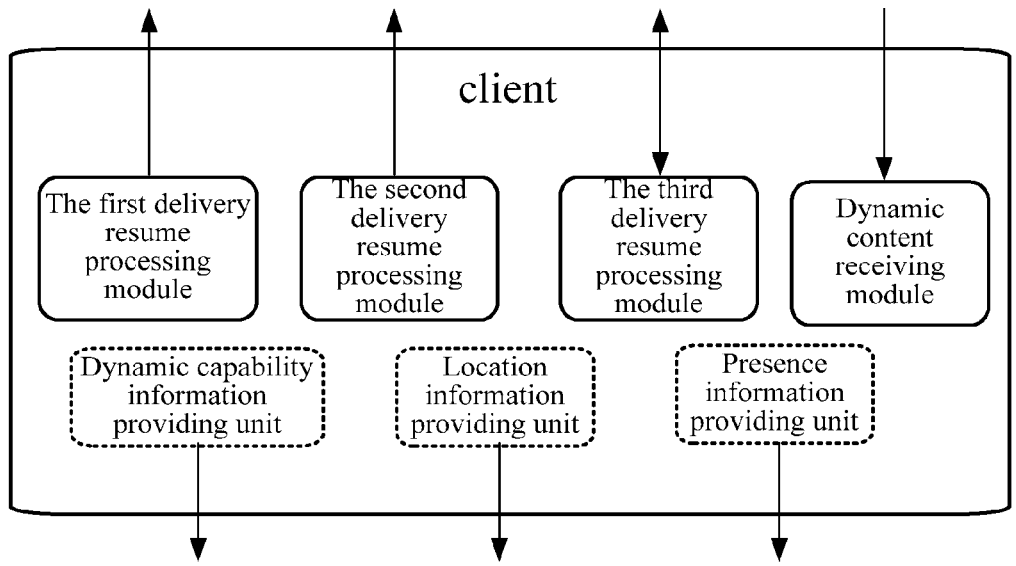
FIG. 6 is a structural representation of the client in the embodiment of the present invention.

In accordance with the delivery resume of dynamic content method provided in above embodiments of the present invention, the present invention provides a client, and the structural diagram of the client is as shown in FIG. 6, including:

a first delivery resume processing module, adapted to send a request for delivering resume of dynamic content to the dynamic content delivery server; and a dynamic content receiving module, adapted to receive the dynamic content delivered by the dynamic content delivery server in the determined delivery resume mode after the dynamic content delivery server receives the delivery resume request; or receive the dynamic content delivered from the dynamic content delivery server in the determined delivery resume mode after the dynamic content delivery server detects that the delivery channel to the client is recovered to normal.

The client further includes:

a second delivery resume processing module, adapted to send a delivery resume mode of dynamic content pre-configuring request to the dynamic content delivery server, and send the pre-configured delivery resume mode of dynamic content to the dynamic content delivery server for storage; and a third delivery resume processing module, adapted to receive a notification message or inquiry message about the delivery resume mode sent by the dynamic content delivery server, and return a response message to the dynamic content delivery server.

Above client may further include a dynamic capability information providing unit, a location information providing unit, and a presence information providing unit, etc., these units provide dynamic capability information, location information, and presence information of the client, respectively.

Figure 7:
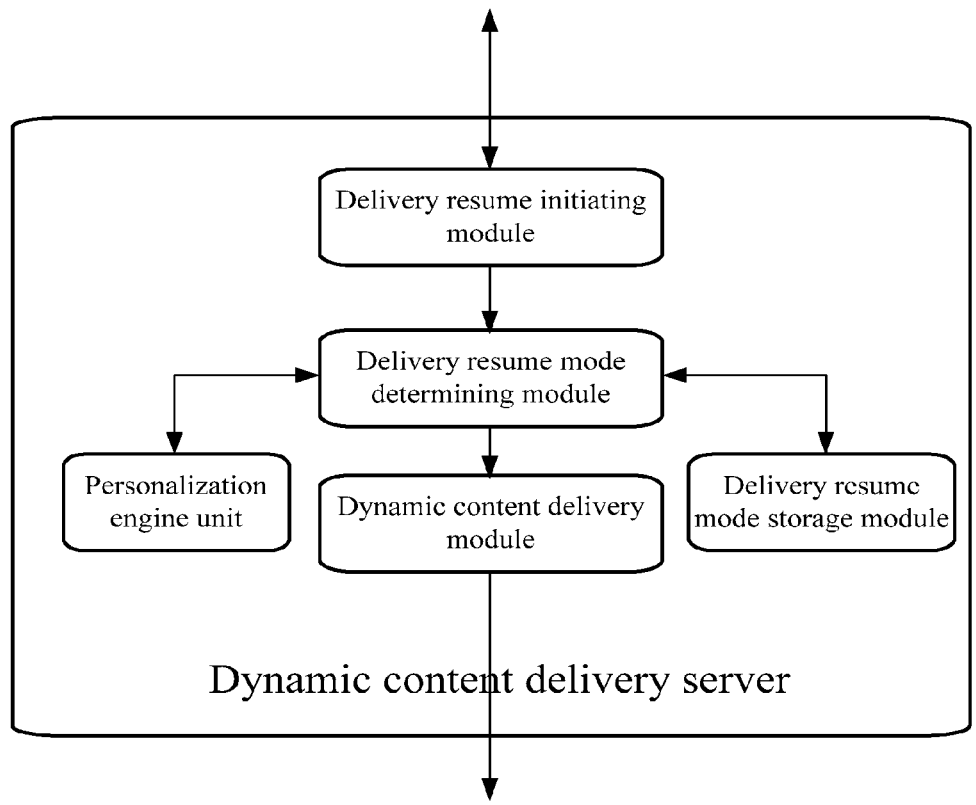
FIG. 7 is a structural representation of the dynamic content delivery server in the embodiment of the present invention.

The present invention further provides an embodiment of dynamic content delivery server, and structural diagram of the server is as shown in FIG. 7, including:

a delivery resume initiating module, adapted to receive the request for delivering resume of dynamic content from the client and/or detect whether the delivery channel to the client is recovered to normal;

a delivery resume mode determining module, adapted to determine the delivery resume mode that is to be used to deliver the dynamic content to the client, according to the delivery resume request from the client and/or the detection result that the delivery channel to the client is recovered to normal; and a dynamic content delivery module, adapted to deliver the dynamic content to the client in the determined delivery resume mode.

The server further includes the following:

A personalization engine unit is adapted to store the dynamic information of the client. The delivery resume mode determining module obtains the dynamic information of the client from the personalization engine unit, and determines the delivery resume mode in accordance with the obtained dynamic information of the client and the type of the dynamic content to be delivered.

A delivery resume mode storage module is adapted to store the delivery resume mode pre-configured by the client or the operator. The delivery resume mode determining module obtains the delivery resume mode pre-configured by the client from the delivery resume mode storage module as the determined delivery resume mode; or, the delivery resume mode determining module obtains the delivery resume mode pre-configured by the operator from the delivery resume mode storage module and notifies the client of the pre-configured delivery resume mode, after receiving a response message for accepting the delivery resume mode from the client, the delivery resume mode determining module uses the delivery resume mode pre-configured by the operator as the determined delivery resume mode.

Figure 8:
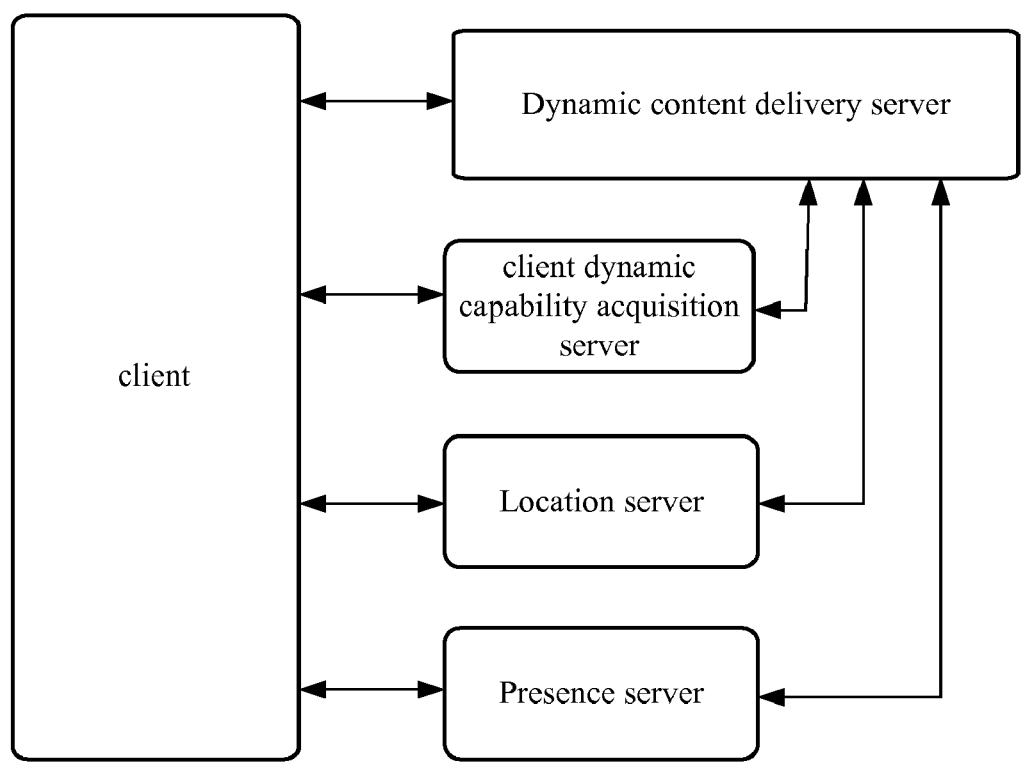
FIG. 8 is a structural representation of the dynamic content delivery system in the embodiment of the present invention.

The client and dynamic content delivery server provided by the above embodiment of the present invention constitutes a dynamic content delivery system as shown in FIG. 8, and the system includes a client and a dynamic content delivery server, one or more servers which are adapted to provide dynamic information of the clients can be connected between the clients and the dynamic content delivery server, for the purpose of providing dynamic information of the clients to the dynamic content delivery server. The servers that provide dynamic information of clients include, but are not limited to location server, presence server, and client dynamic capability acquisition server.

In conclusion, when the delivery of dynamic content is to be resumed by employing the embodiments of the present invention, an appropriate delivery resume mode is chosen in accordance with the dynamic information of the client and the type of the content to be delivered; in this way, the present invention ensures that the resumed dynamic delivery of the is the information that the client needs, and thereby waste of network transmission resources is avoided.

As described in above embodiments of the present invention, if one or more optional delivery resume modes are determined by the dynamic content delivery server, the user is required to determine/choose the delivery resume mode to be used, thereby the user's service experience and satisfaction are further improved.

In above embodiments of the present invention, another way may be employed in which a user pre-configures a delivery resume mode and stores it in the server; in that way, the delivery resume mode negotiation process between the server and the client can be omitted; as the result, the message interaction can be reduced, and the user is given more convenience.

In above embodiments of the present invention, still another way may be employed in which the delivery resume mode is pre-configured by the operator and stored in the server; if the user agrees that the dynamic content is delivered in the delivery resume mode pre-configured by the operator, the server is no longer needed to obtain the dynamic information of the client and analyze it, therefore the workload on the server is reduced.

Apparently, those skilled in the art should recognize that various variations and modifications can be made without departing from the spirit and scope of the present invention. Therefore, if these variations and modifications fall into the scope defined by the claims of the present invention and its equivalents, then the present invention intends to cover these variations and modifications.

What is claimed is:

1. A method for delivery resume of dynamic content, after a dynamic content delivery server detects a delivery channel to a client that receives dynamic content is recovered to normal, or the dynamic content delivery server receives a request for delivering resume of dynamic content from the client, comprising:

determining a delivery resume mode by the dynamic content delivery server; and delivering the dynamic content by the dynamic content delivery server corresponding to the determined delivery resume mode to the client;

wherein determining the delivery resume mode comprises:

obtaining dynamic information related to the dynamic content to be delivered, and determining the delivery resume mode in accordance with the dynamic content to be delivered and the obtained dynamic information;

wherein the dynamic content is a customized user-understandable content for a user of the client, and the dynamic information is an attribute of the client.

2. The method according to claim 1, wherein when several optional delivery resume modes are available, determining the delivery resume mode comprises:

sending an inquiry message to the client with the delivery resume options corresponding to the optional delivery resume modes carried in the message; and determining the corresponding delivery resume mode in accordance with the delivery resume option in a response message after receiving the response message from the client.

3. The method according to claim 2, wherein if the dynamic content delivery server dose not receive response message from the client within a pre-configured time limit, the dynamic content delivery process is terminated.

4. The method according to claim 2, wherein the response message from the client further comprises delivery resume parameters, and the dynamic content delivery server delivers the dynamic content to the client in the determined delivery resume mode according to the delivery resume parameters.

5. A client, comprising:
a first delivery resume processing module, adapted to send a request for delivering resume of dynamic content to a dynamic content delivery server; and
a dynamic content receiving module, adapted to receive the dynamic content from the dynamic content delivery server in a determined delivery resume mode after the dynamic content delivery server receives the delivery resume request; or receive the dynamic content from the dynamic content delivery server in the determined delivery resume mode after the dynamic content delivery server detects the delivery channel to the client is recovered to normal;
wherein the client further comprises:
a dynamic capability information providing unit, a location information providing unit, and a presence information providing unit;
wherein determining the delivery resume mode comprises:
obtaining dynamic information related to the dynamic content to be delivered, and determining the delivery resume mode in accordance with the dynamic content to be delivered and the obtained dynamic information;
wherein the client is a terminal for a user, and the dynamic content is a customized user-understandable content for the user of the client, and the dynamic information is an attribute of the client.

6. The client according to claim 5, wherein the client further comprises:
a third delivery resume processing module, adapted to receive a notification or inquiry message about the delivery resume mode from the dynamic content delivery server, and return a response message to the dynamic content delivery server.

7. A dynamic content delivery server, comprising:
a delivery resume initiating module, adapted to receive a request for delivering resume of dynamic content sent by the client and/or detect whether the delivery channel to the client is recovered to normal;
a delivery resume mode determining module, adapted to determine the delivery resume mode to be used to deliver the dynamic content to the client, according to the delivery resume request from the client and/or when the delivery channel to the client is detected as recovered to normal; and
a dynamic content delivery module, adapted to deliver the dynamic content to the client in the determined delivery resume mode;
wherein the dynamic content delivery server further comprises:
a personalization engine unit, adapted to store the dynamic information of the client;
wherein, the delivery resume mode determining module is adapted to obtain the dynamic information of the client related to the dynamic content to be delivered from the personalization engine unit, and determine the delivery resume mode in accordance with the dynamic content to be delivered and the obtained dynamic information;
wherein the dynamic content is a customized user-understandable content for a user of the client, and the dynamic information is an attribute of the client.

8. A dynamic content delivery system comprising:
a dynamic content delivery server comprising a delivery resume mode determining module and a delivery resume initiating module;
wherein the delivery resume mode determining module is adapted to determine the delivery resume mode, and delivers the dynamic content to a client in the determined delivery resume mode after the delivery resume initiating module detects the transmission channel to the client that receives the dynamic content is recovered to normal or receives a request for delivering resume of dynamic content sent from the client;
wherein the dynamic content delivery system further comprising a client adapted to send a request for delivering resume of dynamic content to the dynamic content delivery server, and receive the dynamic content from the dynamic content delivery server in the determined delivery resume mode; and
wherein the delivery resume mode determining module in the dynamic content delivery server is further adapted to obtain the dynamic information related to the dynamic content to be delivered, and determine the delivery resume mode in accordance with the dynamic content to be delivered and the obtained dynamic information;
wherein the dynamic content is a customized user-understandable content for a user of the client, and the dynamic information is an attribute of the client.

9. The dynamic content delivery system according to claim 8, wherein one or more servers adapted to provide dynamic information of clients are connected to the client and the dynamic content delivery server, for providing dynamic information of the client to the dynamic content delivery server.

* * * * *

UNITED STATES PATENT AND TRADEMARK OFFICE
CERTIFICATE OF CORRECTION

PATENT NO. : 8,412,793 B2
APPLICATION NO. : 12/211736
DATED : April 2, 2013
INVENTOR(S) : Peng et al.

Page 1 of 1

It is certified that error appears in the above-identified patent and that said Letters Patent is hereby corrected as shown below:

In the Claims:

Column 13, line 6, "dose" should read -- does --.

Signed and Sealed this
Eighteenth Day of June, 2013

Teresa Stanek Rea
*Acting Director of the United States Patent and Trademark Office*